US009150725B2

(12) United States Patent
Ha et al.

(10) Patent No.: US 9,150,725 B2
(45) Date of Patent: Oct. 6, 2015

(54) FLAME RETARDANT POLYCARBONATE RESIN COMPOSITION AND MOLDED PRODUCT MADE USING THE SAME

(71) Applicant: Cheil Industries Inc., Gumi-si (KR)

(72) Inventors: Doo Han Ha, Uiwang-si (KR); Young Chul Kwon, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 116 days.

(21) Appl. No.: 13/752,707

(22) Filed: Jan. 29, 2013

(65) Prior Publication Data
US 2013/0137801 A1 May 30, 2013

Related U.S. Application Data

(63) Continuation-in-part of application No. PCT/KR2010/008651, filed on Dec. 3, 2010.

(30) Foreign Application Priority Data

Jul. 30, 2010 (KR) .................. 10-2010-0074229

(51) Int. Cl.
*C08L 69/00* (2006.01)
*C08L 83/10* (2006.01)
*C08L 33/00* (2006.01)
*C08L 83/04* (2006.01)
*C08K 5/526* (2006.01)
*C08L 33/04* (2006.01)
*C08K 5/49* (2006.01)
*C08K 5/523* (2006.01)
*C08G 77/448* (2006.01)

(52) U.S. Cl.
CPC .................. *C08L 69/00* (2013.01); *C08L 33/00* (2013.01); *C08L 83/04* (2013.01); *C08L 83/10* (2013.01); *C08G 77/448* (2013.01); *C08K 5/49* (2013.01); *C08K 5/523* (2013.01); *C08K 5/526* (2013.01); *C08L 33/04* (2013.01); *C08L 2201/02* (2013.01)

(58) Field of Classification Search
CPC .......... C08L 69/00; C08L 33/00; C08K 5/526
USPC ......................................................... 524/127
See application file for complete search history.

(56) References Cited

U.S. PATENT DOCUMENTS

| 3,686,355 | A | 8/1972 | Gaines et al. |
| 4,027,073 | A | 5/1977 | Clark |
| 4,045,514 | A | 8/1977 | Iwahashi et al. |
| 4,263,416 | A | 4/1981 | Liu et al. |
| 4,287,315 | A | 9/1981 | Meyer et al. |
| 4,289,859 | A | 9/1981 | Kalinowski et al. |
| 4,400,333 | A | 8/1983 | Neefe |
| 4,554,302 | A | 11/1985 | Miller |
| 4,745,029 | A | 5/1988 | Kambour |
| 4,906,696 | A | 3/1990 | Fischer et al. |
| 5,061,558 | A | 10/1991 | Fischer et al. |
| 5,200,492 | A | 4/1993 | Ohnaga et al. |
| 5,280,070 | A | 1/1994 | Drzewinski et al. |
| 5,284,916 | A | 2/1994 | Drzewinski |
| 5,292,809 | A | 3/1994 | Drzewinski et al. |
| 5,449,557 | A | 9/1995 | Liebler et al. |
| 5,451,632 | A | 9/1995 | Okumura et al. |
| 5,473,019 | A | 12/1995 | Siol et al. |
| 5,530,083 | A | 6/1996 | Phelps et al. |
| 6,001,929 | A | 12/1999 | Nodera et al. |
| 6,010,974 | A | 1/2000 | Kim et al. |
| 6,252,002 | B1 | 6/2001 | Yamada et al. |
| 6,284,700 | B1 | 9/2001 | Lyu et al. |
| 6,576,706 | B1 | 6/2003 | Nodera et al. |
| 6,646,068 | B2 | 11/2003 | Chisholm et al. |
| 6,657,018 | B1 | 12/2003 | Hoover |
| 6,790,887 | B1 | 9/2004 | Nishihara |
| 7,067,188 | B1 | 6/2006 | Yang et al. |
| 7,294,659 | B2 | 11/2007 | Yatake |
| 7,365,125 | B2 | 4/2008 | Govaerts et al. |
| 7,553,895 | B2 | 6/2009 | An et al. |
| 7,732,515 | B2 | 6/2010 | Jang et al. |
| 8,410,238 | B2 | 4/2013 | Ko et al. |
| 2002/0042483 | A1 | 4/2002 | Vanderbilt |
| 2003/0065071 | A1 | 4/2003 | Scholten |
| 2005/0101757 | A1 | 5/2005 | Glasgow et al. |
| 2005/0256246 | A1* | 11/2005 | Van Hartingsveldt et al. ............... 524/494 |
| 2006/0004154 | A1 | 1/2006 | DeRudder et al. |
| 2006/0030647 | A1 | 2/2006 | Ebeling et al. |
| 2006/0047037 | A1 | 3/2006 | Kawato et al. |
| 2006/0074156 | A1* | 4/2006 | Ebeling et al. ............. 524/115 |
| 2007/0105994 | A1 | 5/2007 | Li et al. |
| 2007/0213452 | A1 | 9/2007 | Kawato et al. |
| 2007/0293608 | A1 | 12/2007 | Chen et al. |

(Continued)

FOREIGN PATENT DOCUMENTS

CN 101434749 A 5/2009
CN 101735586 A 6/2010

(Continued)

OTHER PUBLICATIONS

Office Action in commonly owned U.S. Appl. No. 13/269,653 mailed Dec. 9, 2013, pp. 1-11.

(Continued)

*Primary Examiner* — Doris Lee
(74) *Attorney, Agent, or Firm* — Additon, Higgins & Pendleton, P.A.

(57) ABSTRACT

A flame retardant polycarbonate resin composition that can have excellent scratch resistance and impact resistance includes: (A) about 10 to about 89 wt % of a polycarbonate resin; (B) about 10 to about 89 wt % of a polycarbonate-polysiloxane copolymer; (C) about 1 to about 70 wt % of a modified (meth)acrylic copolymer resin; and (D) about 1 to about 50 parts by weight of a phosphorus-based flame retardant, based on about 100 parts by weight of components (A)+(B)+(C).

15 Claims, No Drawings

(56) References Cited

U.S. PATENT DOCUMENTS

| | | |
|---|---|---|
| 2008/0015291 A1 | 1/2008 | Siripurapu et al. |
| 2008/0029744 A1 | 2/2008 | Jansen et al. |
| 2008/0227896 A9 | 9/2008 | Ebeling et al. |
| 2009/0023871 A9 | 1/2009 | Fujiguchi et al. |
| 2009/0069489 A1 | 3/2009 | Vollenberg et al. |
| 2009/0080079 A1 | 3/2009 | Kogure et al. |
| 2009/0118402 A1 | 5/2009 | Jang et al. |
| 2009/0318629 A1 | 12/2009 | Adoni et al. |
| 2010/0029855 A1 | 2/2010 | Matsuoka et al. |
| 2010/0113697 A1 | 5/2010 | Lee et al. |
| 2010/0152357 A1 | 6/2010 | Kwon et al. |
| 2010/0168272 A1 | 7/2010 | Park et al. |
| 2010/0240831 A1 | 9/2010 | Kim et al. |
| 2010/0256288 A1 | 10/2010 | Kim et al. |
| 2011/0009524 A1 | 1/2011 | Kwon et al. |
| 2011/0021677 A1 | 1/2011 | Kwon et al. |
| 2011/0040019 A1 | 2/2011 | Kwon et al. |
| 2011/0160380 A1 | 6/2011 | Kwon et al. |
| 2012/0129993 A1 | 5/2012 | Ha et al. |
| 2013/0289193 A1 | 10/2013 | Ahn et al. |

FOREIGN PATENT DOCUMENTS

| | | |
|---|---|---|
| EP | 1010725 A2 | 6/2000 |
| EP | 1533340 A1 | 5/2005 |
| EP | 1555296 A1 | 7/2005 |
| EP | 2204412 A1 | 7/2010 |
| GB | 2057464 A | 4/1981 |
| JP | 04-023856 A | 1/1992 |
| JP | 04-359954 A | 12/1992 |
| JP | 06-313089 A | 11/1994 |
| JP | 2000-086844 A | 3/2000 |
| JP | 2001-049072 A | 2/2001 |
| JP | 2002-080676 | 3/2002 |
| JP | 2005-247999 A | 9/2005 |
| JP | 2006-131833 | 5/2006 |
| JP | 2006-249288 A | 9/2006 |
| JP | 2006-249292 A | 9/2006 |
| JP | 2006-257126 | 9/2006 |
| JP | 2006-257284 A | 9/2006 |
| JP | 2006-342246 A | 12/2006 |
| JP | 2009-040876 A | 2/2009 |
| JP | 2010-202825 A | 9/2010 |
| KR | 10-2000-0048033 A | 7/2000 |
| KR | 2004-79118 A | 9/2004 |
| KR | 10-2006-0050497 A | 5/2006 |
| KR | 10-0767428 B1 | 10/2007 |
| KR | 10-2009-0018827 A | 2/2009 |
| KR | 10-2009-0020648 A | 2/2009 |
| KR | 10-2009-0026339 | 3/2009 |
| KR | 10-2009-0035031 A | 4/2009 |
| KR | 10-2009-0066204 | 6/2009 |
| KR | 10-2009-0066204 A | 6/2009 |
| KR | 10-2010-0049458 A | 5/2010 |
| WO | 00/46299 A1 | 8/2000 |
| WO | 2007/119920 A1 | 10/2007 |
| WO | 2007/140101 A1 | 12/2007 |
| WO | 2008/081791 A1 | 7/2008 |
| WO | WO 2009/051373 * | 4/2009 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A1 | 10/2009 |
| WO | 2012/015109 A1 | 2/2012 |
| WO | 2012/091293 A2 | 7/2012 |

OTHER PUBLICATIONS

International Search Report in commonly owned International Application No. PCT/KR2008/007157, dated May 28, 2009, pp. 1-2.
Office Action in commonly owned U.S. Appl. No. 12/792,176 mailed Nov. 16, 2011, pp. 1-12.
International Search Report in commonly owned International Application No. PCT/KR2008/007825, dated Aug. 28, 2009, pp. 1-2.
Office Action in commonly owned U.S. Appl. No. 12/880,209 mailed Feb. 16, 2011, pp. 1-10.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.
International Search Report in commonly owned International Application No. PCT/KR2008/007820 dated Jul. 28, 2009, pp. 1-2.
Final Office Action in commonly owned U.S. Appl. No. 12/642,904 mailed Mar. 27, 2012, pp. 1-7.
Notice of Allowance in commonly owned U.S. Appl. No. 12/642,904 mailed Jul. 2, 2012, pp. 1-8.
European Search Report in commonly owned European Application No. 08873425.6 dated May 29, 2012, pp. 1-5.
Office Action in commonly owned U.S. Appl. No. 12/884,549 mailed Aug. 21, 2012, pp. 1-12.
Final Office Action in commonly owned U.S. Appl. No. 12/792,176 mailed Apr. 19, 2012, pp. 1-10.
Advisory Action in commonly owned U.S. Appl. No. 12/792,176 mailed Aug. 23, 2012, pp. 1-4.
Final Office Action in commonly owned U.S. Appl. No. 12/631,018 mailed Apr. 26, 2012, pp. 1-12.
Mark, Physical Properties of Polymers Handbook, 2nd Edition, Polymer Research Center and Department of Chemistry, University of Cincinnati, OH, (2007) Springer, pp. 5-7.
Polysciences, Inc., data sheet for benzyl acrylate, no date, pp. 1-2.
Guidechem, data sheet for RUBA-93, no date, pp. 1-2.
European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
Office Action in commonly owned U.S. Appl. No. 12/642,904 mailed Dec. 14, 2011, pp. 1-9.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/631,018 mailed Nov. 8, 2011, pp. 1-10.
European Search Report in commonly owned European Application No. 10196806 dated Apr. 27, 2011, pp. 1-5.
International Search Report in counterpart International Application No. PCT/KR2010/008651 dated Aug. 25, 2011, pp. 1-2.
European Search Report in commonly owned European Application No. 08862371 dated Dec. 7, 2010, pp. 1-6.
Japanese Office Action in commonly owned Japanese Application No. 2010-539284, dated Sep. 11, 2012, pp. 1-3.
International Search Report in commonly owned International Application No. PCT/KR2008/006870, dated May 28, 2009, pp. 1-2.
Korean Office Action in commonly owned Korean Application No. 10-2010-0074229 dated Mar. 16, 2013, 4 pages.
European Search Report and Written Opinion in commonly owned European Application No. 11186686.9 dated Mar. 6, 2012, pp. 1-5.
Office Action in commonly owned U.S. Appl. No. 12/980,718 mailed Jul. 17, 2013, pp. 1-8.
Chinese Office Action in commonly owned Chinese Application No. 201110314363.9, dated Nov. 5, 2013, pp. 1-9.
English translation of Chinese Office Action in commonly owned Chinese Application No. 201110314363.9, dated Nov. 5, 2013, pp. 1-8.
International Search Report in commonly owned International Application No. PCT/KR2011/008930 dated Jun. 29, 2012, pp. 1-6.
Office Action in commonly owned U.S. Appl. No. 13/931,952 mailed Jul. 30, 2014, pp. 1-9.

* cited by examiner

FLAME RETARDANT POLYCARBONATE RESIN COMPOSITION AND MOLDED PRODUCT MADE USING THE SAME

CROSS-REFERENCE TO RELATED APPLICATIONS

This application is a continuation-in-part of International Application No. PCT/KR2010/008651, filed Dec. 3, 2010, pending, which designates the U.S., published as WO 2012/015109, and is incorporated herein by reference in its entirety, and claims priority therefrom under 35 USC Section 120. This application also claims priority under 35 USC Section 119 from Korean Patent Application No. 10-2010-0074229, filed Jul. 30, 2010, in the Korean Intellectual Property Office, the entire disclosure of which is also incorporated herein by reference.

FIELD OF THE INVENTION

The present invention relates to a flame retardant polycarbonate resin composition that can have excellent scratch resistance and impact resistance, and molded products made using the same.

BACKGROUND OF THE INVENTION

Polycarbonate resins exhibit excellent toughness, impact resistance, thermal stability, self extinguishability, dimensional stability and heat resistance and thus have been used in the production of electric and electronic products, automobile components, lenses, glass replacement materials, and the like. However, there can be various problems using polycarbonate resins in the production of products requiring transparency, such as significant deterioration in scratch resistance as compared to glass, and yellowing upon exposure to sunlight for a long period of time.

In contrast, unlike polycarbonate resins, poly(methyl methacrylate) (PMMA) resins can exhibit excellent weather resistance, transparency, flexural strength, flexural strain, adhesion, and the like, and thus have been used in adhesives, lighting materials, building materials, and the like. However, due to their low impact strength, PMMA cannot be used in products having less than a certain thickness in order to ensure sufficient impact strength.

It is expected that an alloy of such polycarbonate resins and PMMA resins could ensure both impact resistance and scratch resistance. However, in practice, due to poor compatibility and the large refractive index difference between these resins, the alloy is opaque and has poor appearance and quality, thereby exhibiting low impact resistance and scratch resistance.

Recently, in order to develop products having a luxurious appearance such as a highly glossy texture, resin compositions have been subjected to coating processes. However, these processes have problems in that they involve various steps, can have high defect rates, and can generate large amounts of volatile organic compounds, which can increase costs.

In order to solve these problems, non-painted materials have been developed. In order for a certain material to be used as a non-painted material, the material must have a highly glossy texture and provide scratch resistance upon coating. However, resins developed up to now are not satisfactory in terms of physical properties such as coloring property, impact resistance, heat resistance, scratch resistance, and the like.

The present inventors have developed a resin composition including a polycarbonate resin, a polycarbonate-polysiloxane copolymer, and a modified (meth)acrylic copolymer. However, transparency and impact resistance of the composition can deteriorate when flame retardants are added for applications requiring flame retardancy such as home appliances and IT and OA devices. Further, when adding rubber components to improve impact resistance, the resin composition can exhibit decreased transparency and scratch resistance, and thus can fail to provide desired physical properties.

Therefore, there is a need to develop a resin composition which satisfies not only coloring property, impact resistance, heat resistance, and scratch resistance, but also transparency and flame retardancy.

SUMMARY OF THE INVENTION

The present invention provides a polycarbonate resin composition that can have an excellent balance of coloring property, impact resistance, heat resistance, scratch resistance, transparency and/or flame retardancy. The present invention further provides a polycarbonate resin composition, which can be suitable for use as a flame retardant non-painted material. The present invention also provides a polycarbonate resin composition, which can have excellent transparency and may achieve V-2 flame retardancy. The present invention also provides a polycarbonate resin composition, which can have translucency and may achieve V-0 flame retardancy. The present invention provides a polycarbonate resin composition, which can achieve innovative cost reduction and eco-friendly effects by removing a coating process in manufacture of products requiring flame retardancy and high glossy non-painting.

The flame retardant polycarbonate resin composition can have excellent scratch resistance and impact resistance. The resin composition includes: (A) about 10 wt % to about 89 wt % of a polycarbonate resin; (B) about 10 wt % to about 89 wt % of a polycarbonate-polysiloxane copolymer; (C) about 1 wt % to about 70 wt % of a modified (meth)acrylic copolymer resin; and (D) about 1 part by weight to about 50 parts by weight of a phosphorus-based flame retardant based on about 100 parts by weight of the components (A)+(B)+(C).

In one embodiment, the polycarbonate-polysiloxane copolymer (B) may include about 1 wt % to about 99 wt % of a polycarbonate block and about 1 wt % to about 99 wt % of a polysiloxane block.

The modified (meth)acrylic copolymer resin (C) may have a refractive index ranging from about 1.495 to about 1.590.

In one embodiment, the modified (meth)acrylic copolymer resin (C) may have a weight average molecular weight ranging from about 5,000 g/mol to about 25,000 g/mol.

In another embodiment, the modified (meth)acrylic copolymer resin (C) may have a weight average molecular weight ranging from about 25,000 g/mol to about 50,000 g/mol.

The modified (meth)acrylic copolymer resin (C) may be a polymer of aromatic and/or alicyclic (meth)acrylates. In one embodiment, the modified (meth)acrylic copolymer resin (C) may be a polymer of (C1) about 20 wt % to about 100 wt % of an aromatic and/or alicyclic (meth)acrylate and (C2) about 0 to about 80 wt % of a monofunctional unsaturated monomer.

Examples of the monofunctional unsaturated monomer (C2) may include (meth)acrylate esters, unsaturated carboxylic acids, acid anhydrides, hydroxyl group-containing esters, amides, nitriles, allyl glycidyl ethers, glycidyl methacrylate, styrene monomers, and the like, and combinations thereof.

In one embodiment, the weight ratio of the polycarbonate-polysiloxane copolymer (B) to the modified (meth)acrylic copolymer (C) may range about 12:88 to about 99:1.

Examples of the phosphorus-based flame retardant (D) may include phosphates, phosphonates, phosphinates, phosphine oxides, phosphazenes, metal salts thereof, and the like, and combinations thereof.

In one embodiment, the phosphorus-based flame retardant (D) is a mixture of two or more of aromatic phosphate esters represented by Formula 4:

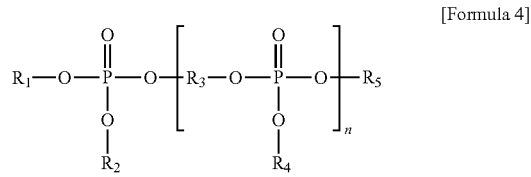

[Formula 4]

wherein $R_1$, $R_2$, $R_4$, and $R_5$ are the same or different and are each independently $C_6$-$C_{20}$ aryl or $C_1$-$C_{10}$ alkyl substituted $C_6$-$C_{20}$ aryl, $R_3$ is derived from a dialcohol of resorcinol, hydroquinol, bisphenol-A or bispheol-S, and n is an integer from 1 to 5.

The resin composition may further include at least one additive selected from the group consisting of antimicrobial agents, heat stabilizers, antioxidants, release agents, light stabilizers, inorganic additives, surfactants, coupling agents, plasticizers, blending agents, stabilizers, lubricants, antistatic agents, colorants, flame-proofing agents, weather-proofing agents, coloring agents, ultraviolet (UV) absorbers, UV blocking agents, flame retardants, fillers, nucleating agents, adhesion aids, adhesives, and combinations thereof.

The polycarbonate resin composition may have a light transmittance of about 90% or more as measured using a 2.5 mm thickness specimen in accordance with ASTM D1003, a haze of less than about 2.5% as measured using a 2.5 mm thickness specimen in accordance with ASTM D1003, and a flame retardancy of V-2 or more as measured using a 1/16" thickness specimen in accordance with UL94.

In another embodiment, the resin composition may have a light transmittance of about 70% to about 90% as measured using a 2.5 mm thickness specimen in accordance with ASTM D1003, a haze of about 40% to about 60% as measured using a 2.5 mm thickness specimen in accordance with ASTM D1003, and a flame retardancy of V-0 or more as measured using a 1/16" thickness specimen in accordance with UL94.

The present invention also provides a molded product manufactured using the polycarbonate resin composition.

The polycarbonate resin composition according to the present invention can exhibit an excellent balance of physical properties, such as coloring property, impact resistance, heat resistance, scratch resistance, transparency and/or flame retardancy, can be suitable for use as a flame retardant non-painted material, and can achieve innovative cost reduction and eco-friendly effects by eliminating coating processes.

DETAILED DESCRIPTION OF THE INVENTION

The present invention now will be described more fully hereinafter in the following detailed description of the invention, in which some, but not all embodiments of the invention are described with reference to the accompanying drawings. Indeed, this invention may be embodied in many different forms and should not be construed as limited to the embodiments set forth herein; rather, these embodiments are provided so that this disclosure will satisfy applicable legal requirements.

As used herein, the term "(meth)acrylate" includes "acrylate" and "methacrylate" unless otherwise indicated.

Further, unless otherwise indicated, "substituted" means that a hydrogen atom of a compound is substituted by a halogen atom (F, Cl, Br, and I), a hydroxyl group, a nitro group, a cyano group, an amino group, an azido group, an amidino group, a hydrazino group, a hydrazono group, a carbonyl group, a carbamyl group, a thiol group, an ester group, a carboxyl group or salt thereof, a sulfonic acid group or salt thereof, a phosphate group or salt thereof, a $C_1$ to $C_{20}$ alkyl group, a $C_2$ to $C_{20}$ alkenyl group, a $C_2$ to $C_{20}$ alkynyl group, a $C_1$ to $C_{20}$ alkoxy group, a $C_6$ to $C_{30}$ aryl group, a $C_6$ to $C_{30}$ aryloxy group, a $C_3$ to $C_{30}$ cycloalkyl group, a $C_3$ to $C_{30}$ cycloalkenyl group, a $C_3$ to $C_{30}$ cycloalkynyl group, or a combination thereof.

The polycarbonate resin composition according to one embodiment includes (A) a polycarbonate resin, (B) a polycarbonate-polysiloxane copolymer, (C) a modified (meth)acrylic copolymer resin and (D) a phosphorus-based flame retardant.

Now, each component will be described in detail.

(A) Polycarbonate Resin

The polycarbonate resin may be prepared by reacting diphenols represented by Formula 1 with phosgene, halogen acid ester, carbonic acid ester, or a combination thereof

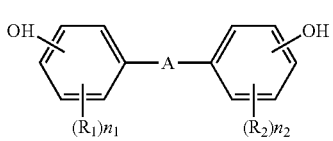

[Formula 1]

wherein A is a single bond, substituted or unsubstituted $C_1$ to $C_{30}$ linear or branched alkylene, substituted or unsubstituted $C_2$ to $C_5$ alkenylene, substituted or unsubstituted $C_2$ to $C_5$ alkylidene, substituted or unsubstituted $C_1$ to $C_{30}$ linear or branched haloalkylene, substituted or unsubstituted $C_5$ to $C_6$ cycloalkylene, substituted or unsubstituted $C_5$ to $C_6$ cycloalkenylene, substituted or unsubstituted $C_5$ to $C_{10}$ cycloalkylidene, substituted or unsubstituted $C_6$ to $C_{30}$ arylene, substituted or unsubstituted $C_1$ to $C_{20}$ linear or branched alkoxylene, a halogen acid ester group, a carbonic acid ester group, CO, S, or $SO_2$;

$R_1$ and $R_2$ are the same or different and are each independently substituted or unsubstituted $C_1$ to $C_{30}$ alkyl or substituted or unsubstituted $C_6$ to $C_{30}$ aryl; and $n_1$ and $n_2$ are the same or different and are each independently an integer from 0 to 4.

The polycarbonate resin may have a repeat unit by combining two or more kinds of diphenols represented by Formula 1. Examples of diphenols may include without limitation 4,4'-dihydroxydiphenyl, 2,2-bis(4-hydroxyphenyl)propane (bisphenol A), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis (4-hydroxphenyl)ketone, bis(4-hydroxyphenyl)ether and the like, and combinations thereof. In exemplary embodiments, 2,2-bis(4-hydroxyphenyl)propane, 2,2-bis(3,5-dichloro-4- hydroxyphenyl)propane and/or 1,1-bis(4-hydroxyphenyl)cyclohexane can be used, for example, 2,2-bis(4-hydroxyphenyl)propane can be used.

The polycarbonate resin may have a weight average molecular weight ranging from about 10,000 g/mol to 200,000 g/mol. In one embodiment, the polycarbonate resin may have a weight average molecular weight ranging from about 15,000 g/mol to 80,000 g/mol, without being limited thereto.

The polycarbonate resin may be a copolymer or a mixture of copolymers prepared from two or more kinds of diphenols. Further, the polycarbonate resin may include a linear polycarbonate resin, a branched polycarbonate resin, a polyester-carbonate copolymer resin and the like or a combination thereof.

Examples of linear polycarbonate resins may include bisphenol-A polycarbonate resins and the like. Examples of branched polycarbonate resins include compounds prepared by reacting a multifunctional aromatic compound, such as trimellitic anhydride, trimellitic acid and the like with diphenols and carbonate. The multifunctional aromatic compound may be present in an amount of about 0.05 mol % to about 2 mol % based on the total amount of the branched polycarbonate resin. Examples of polyester-carbonate copolymer resins may include compounds prepared by reacting a bifunctional carboxylic acid with diphenols and carbonate. Examples of carbonates include diaryl carbonate, such as diphenyl carbonate, and ethylene carbonate and the like.

The polycarbonate resin may have a melt flow index (MFI) of about 3 g/10 min to about 120 g/10 min under conditions of 310° C. and 1.2 kgf.

The resin composition may include the polycarbonate resin in an amount of about 10 wt % to about 89 wt %, for example about 20 wt % to about 72 wt %, based on 100 wt % of the components (A)+(B)+(C). In some embodiments, the resin composition may include the polycarbonate resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, or 89 wt %. Further, according to some embodiments of the present invention, the amount of polycarbonate resin can be in a range from about any of the foregoing amounts to about any other of the foregoing amounts.

When the resin composition includes polycarbonate resin in an amount within this range, an excellent balance of properties such as impact strength, heat resistance, and/or processability may be obtained.

(B) Polycarbonate-Polysiloxane Copolymer

The polycarbonate-polysiloxane copolymer includes a polycarbonate block and a polysiloxane block.

The polycarbonate block may include a structural unit derived from the polycarbonate resin (A) mentioned above.

The polysiloxane block may include a structural unit represented by Formula 2:

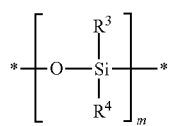

[Formula 2]

wherein $R^3$ and $R^4$ may be the same or different and are each independently hydrogen, substituted or unsubstituted $C_1$ to $C_{20}$ alkyl, substituted or unsubstituted $C_2$ to $C_{20}$ alkenyl, substituted or unsubstituted $C_2$ to $C_{20}$ alkynyl, substituted or unsubstituted $C_1$ to $C_{20}$ alkoxy, substituted or unsubstituted $C_3$ to $C_{30}$ cycloalkyl, substituted or unsubstituted $C_3$ to $C_{30}$ cycloalkenyl, substituted or unsubstituted $C_3$ to $C_{30}$ cycloalkynyl, substituted or unsubstituted $C_6$ to $C_{30}$ aryl, substituted or unsubstituted $C_6$ to $C_{30}$ aryloxy, substituted or unsubstituted $C_6$ to $C_{30}$ aryl, or NRR' wherein R and R' may be the same or different and are each independently hydrogen or substituted or unsubstituted $C_1$ to $C_{20}$ alkyl.

In Formula 2, m may be an integer ranging from about 2 to about 10,000. In exemplary embodiments, m may be an integer ranging from about 2 to about 1,000, for example m may be an integer ranging from about 10 to about 100, and as another example m may be an integer ranging from about 25 to about 80. When m is within this range, excellent impact resistance may be obtained and proper viscosity may be maintained, providing favorable conditions for extrusion.

The polycarbonate-polysiloxane copolymer may include about 1 wt % to about 99 wt % of the polycarbonate block and about 1 wt % to about 99 wt % of the polysiloxane block. In one embodiment, the polycarbonate-polysiloxane copolymer may include about 40 wt % to about 80 wt % of the polycarbonate block and about 20 wt % to about 60 wt % of the polysiloxane block. In another embodiment, the polycarbonate-polysiloxane copolymer may include about 80 wt % to about 95 wt % of the polycarbonate block and about 5 wt % to about 20 wt % of the polysiloxane block.

In some embodiments, the polycarbonate-polysiloxane copolymer may include the polycarbonate block in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of polycarbonate block can be in a range from about any of the foregoing amounts to about any other of the foregoing amounts.

In some embodiments, the polycarbonate-polysiloxane copolymer may include the polysiloxane block in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of polysiloxane block can be in a range from about any of the foregoing amounts to about any other of the foregoing amounts.

When the polycarbonate-polysiloxane copolymer includes the polycarbonate and/or polysiloxane blocks in amounts within this range, excellent impact resistance may be obtained.

The polycarbonate-polysiloxane copolymer may have a weight average molecular weight ranging from about 10,000 g/mol to about 30,000 g/mol. In one embodiment, the polycarbonate-polysiloxane copolymer may have a weight average molecular weight ranging from about 15,000 g/mol to about 22,000 g/mol. Within this range, excellent impact resistance may be obtained.

The polycarbonate-polysiloxane copolymer may reinforce the impact resistance of the polycarbonate resin composition which can be reduced due to use of the modified (meth)acrylic copolymer described below.

The resin composition may include the polycarbonate-polysiloxane copolymer in an amount of about 10 wt % to about 89 wt %, for example about 20 wt % to about 70 wt %, based on 100 wt % of the components (A)+(B)+(C). In some embodiments, the resin composition may include the polycarbonate-polysiloxane copolymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, or 89 wt %. Further, according to some embodiments of the present invention, the amount of polycarbonate-polysiloxane copolymer can be in a range from about any of the foregoing amounts to about any other of the foregoing amounts.

When the resin composition includes the polycarbonate-polysiloxane copolymer in an amount within this range, the composition may exhibit an excellent balance of properties such as impact strength, heat resistance, and/or processability.

(C) Modified (Meth)Acrylic Copolymer Resin

The modified (meth)acrylic copolymer resin (C) may be a polymer of aromatic and/or alicyclic (meth)acrylates. In one embodiment, the modified (meth)acrylic copolymer resin (C) may be a homopolymer of aromatic or alicyclic (meth)acrylates. In another embodiment, the modified (meth)acrylic copolymer resin (C) may be a copolymer of two or more kinds of aromatic and/or alicyclic (meth)acrylates. In still another embodiment, the modified (meth)acrylic copolymer resin (C) may be a copolymer of aromatic and/or alicyclic (meth)acrylates and a monomer copolymerizable therewith. In yet another embodiment, the modified (meth)acrylic copolymer resin (C) may be a mixture of two or more of the modified (meth)acrylic copolymer resins.

In exemplary embodiments, the modified (meth)acrylic copolymer resin (C) may be a polymer including (C1) about 20 wt % to about 100 wt %, for example about 20 wt % to about 99.9 wt %, of an aromatic and/or alicyclic (meth)acrylate and (C2) about 0 to about 80 wt %, for example about 0.1 wt % to about 80 wt %, of a monofunctional unsaturated monomer.

In some embodiments, the modified (meth)acrylic copolymer resin (C) may include the aromatic and/or alicyclic (meth)acrylate (C1) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, 99.8, 99.9, or 100 wt %. Further, according to some embodiments of the present invention, the amount of aromatic and/or alicyclic (meth)acrylate (C1) can be in a range from about any of the foregoing amounts to about any other of the foregoing amounts.

In some embodiments, the modified (meth)acrylic copolymer resin (C) may include the monofunctional unsaturated monomer (C2) in an amount of 0 (the monofunctional unsaturated monomer is not present), about 0 (the monofunctional unsaturated monomer is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of monofunctional unsaturated monomer (C2) can be in a range from about any of the foregoing amounts to about any other of the foregoing amounts.

When the modified (meth)acrylic copolymer resin (C) includes (C1) aromatic and/or alicyclic (meth)acrylate and (C2) monofunctional unsaturated monomer in an amount within this range, the modified (meth)acrylic copolymer resin may have an average refractive index of about 1.495 or more.

The term aromatic or alicyclic (meth)acrylate (C1) refers to a (meth)acrylate compound substituted by an aromatic compound and/or an alicyclic compound.

In one embodiment, the aromatic and/or alicyclic (meth)acrylate (C1) may have a structure represented by Formula 3-1 and/or Formula 3-2.

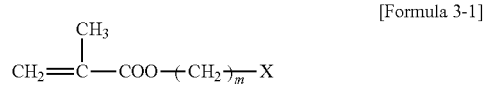

[Formula 3-1]

wherein m is an integer from 0 to 10, and X is substituted or unsubstituted $C_6$ to $C_{30}$ aryl, substituted or unsubstituted $C_3$ to $C_{30}$ cycloalkyl, substituted or unsubstituted $C_3$ to $C_{30}$ cycloalkenyl, or substituted or unsubstituted $C_3$ to $C_{30}$ cycloalkynyl.

In one embodiment, X may be a cyclohexyl group, a phenyl group, a methylphenyl group, a methylethylphenyl group, a propylphenyl group, a methoxyphenyl group, a cyclohexylphenyl group, a chlorophenyl group, a bromophenyl group, a phenylphenyl group, or a benzylphenyl group.

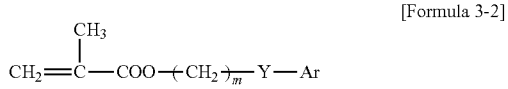

[Formula 3-2]

wherein m is an integer from 0 to 10, Y is oxygen (O) or sulfur (S), and Ar is substituted or unsubstituted $C_6$ to $C_{30}$ aryl, substituted or unsubstituted $C_3$ to $C_{30}$ cycloalkyl, substituted or unsubstituted $C_3$ to $C_{30}$ cycloalkenyl, or substituted or unsubstituted $C_3$ to $C_{30}$ cycloalkynyl.

In one embodiment, Ar may be cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group.

Specific examples of the aromatic and/or alicyclic acrylate-based compound may include without limitation cyclohexyl(meth)acrylate, ethylphenoxy(meth)acrylate, 2-ethylthiophenyl(meth)acrylate, 2-ethylaminophenyl(meth)acrylate, phenyl(meth)acrylate, benzyl (meth)acrylate, 2-phenylethyl(meth)acrylate, 3-phenylpropyl(meth)acrylate, 4-phenylbutyl(meth)acrylate, 2-2-methylphenylethyl(meth)acrylate, 2-3-methylphenylethyl(meth)acrylate, 2-4-methylphenylethyl(meth)acrylate, 2-(4-propylphenyl)ethyl (meth)acrylate, 2-(4-(1-methylethyl)phenyl)ethyl (meth)acrylate, 2-(4-methoxyphenyl)ethyl (meth)acrylate, 2-(4-cyclohexylphenyl)ethyl (meth)acrylate, 2-(2-chlorophenyl)ethyl (meth)acrylate, 2-(3-chlorophenyl)ethyl (meth)acrylate, 2-(4-chlorophenyl)ethyl (meth)acrylate, 2-(4-bromophenyl)ethyl (meth)acrylate, 2-(3-phenylphenyl)ethyl (meth)acrylate, 2-(4-benzylphenyl)ethyl (meth)acrylate, and the like, and combinations thereof. In exemplary embodiment, cyclohexyl(meth)acrylate, ethylphenoxy(meth)acrylate, phenyl(meth)acrylate, or a combination thereof may be used, without being limited thereto.

A monomer copolymerizable with the aromatic and/or alicyclic acrylate-based compound may be the monofunctional unsaturated monomer (C2). Examples of the monofunctional unsaturated monomer (C2) may include without limitation (meth)acrylic acid esters, unsaturated carboxylic acids, acid anhydrides, hydroxyl group-containing esters, amides, nitriles, allyl glycidyl ethers, glycidyl methacrylates, styrene monomers and the like, without being limited thereto. These monomers may be used alone or in combination of two or more thereof.

Specific examples of the mono-functional unsaturated monomer may include, without being limited to, $C_1$-$C_{10}$ alkyl methacrylates such as methyl methacrylate, ethyl methacrylate, propyl methacrylate, butyl methacrylate and the like; $C_1$-$C_{10}$ alkyl acrylates such as methyl acrylate, ethyl acrylate, propyl acrylate, butyl acrylate, 2-ethylhexyl acrylate and the like; unsaturated carboxylic acids such as acrylic acid, methacrylic acid and the like; acid anhydrides such as maleic anhydride and the like; hydroxyl group containing acrylates such as 2-hydroxyethyl acrylate, 2-hydroxypropyl acrylate, monoglycerol acrylate and the like; amides such as acrylamide, methacrylamide and the like; nitriles such as acrylonitrile, methacrylonitrile and the like; allyl glycidyl ether; glycidyl methacrylate; styrenes such as styrene, α-methylstyrene and the like; and combinations thereof. In exemplary embodiments, alkyl methacrylates and/or alkyl acrylates may be used, without being limited thereto.

Examples of the modified (meth)acrylic copolymer may include a copolymer of methyl methacrylate and phenyl methacrylate and the like.

The modified (meth)acrylic copolymer may be polymerized by conventional bulk polymerization, emulsion polymerization, or suspension polymerization.

The modified (meth)acrylic copolymer may have a higher refractive index than common acrylate-based polymers. That is, the modified (meth)acrylic copolymer may have the same refractive index as the polycarbonate resin. In one embodiment, the modified (meth)acrylic copolymer may have a refractive index ranging from about 1.495 to about 1.590. When the modified (meth)acrylic copolymer has a high refractive index, i.e., when the modified (meth)acrylic copolymer has a refractive index in the above range, compatibility and transparency may be improved, thereby enabling easy blending with the polycarbonate resin. As a result, the polycarbonate resin can have improved scratch resistance and high transparency and can allow a high degree of coloration. In one embodiment, the modified (meth)acrylic copolymer may have a refractive index from about 1.51 to about 1.59.

In one embodiment, the modified (meth)acrylic copolymer resin (C) may have a weight average molecular weight ranging from about 5,000 g/mol to about 25,000 g/mol, for example about 7,000 g/mol to about 20,000 g/mol. When the modified (meth)acrylic copolymer resin (C) has a weight average molecular weight within this range, the polycarbonate resin composition including the modified (meth)acrylic copolymer resin may exhibit high transparency.

In another embodiment, the modified (meth)acrylic copolymer resin (C) may have a weight average molecular weight from about 25,000 g/mol to about 50,000 g/mol. When the modified (meth)acrylic copolymer resin (C) has a weight average molecular weight within this range, the polycarbonate resin composition including the modified (meth)acrylic copolymer resin may exhibit translucency, and thus may be used for a material which does not require high transparency.

The resin composition may include the modified (meth)acrylic copolymer resin (C) in an amount of about 1 wt % to about 70 wt %, for example about 10 wt % to about 60 wt %, based on 100 wt % of components (A)+(B)+(C). In some embodiments, the resin composition may include the modified (meth)acrylic copolymer resin (C) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of modified (meth)acrylic copolymer resin (C) can be in a range from about any of the foregoing amounts to about any other of the foregoing amounts.

When the resin composition includes the modified (meth)acrylic copolymer resin (C) in an amount within this range, the resin composition can exhibit excellent compatibility, impact resistance, and scratch resistance.

In one embodiment, the polycarbonate-polysiloxane copolymer (B) and the modified (meth)acrylic copolymer resin (C) may be mixed in a weight ratio of about 12:88 to about 99:1, for example a weight ratio of about 15:85 to about 90:10.

In some embodiments, a mixture of polycarbonate-polysiloxane copolymer (B) and the modified (meth)acrylic copolymer resin (C) may include the polycarbonate-polysiloxane copolymer (B) in an amount of about 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of polycarbonate-polysiloxane copolymer (B) can be in a range from about any of the foregoing amounts to about any other of the foregoing amounts.

In some embodiments, a mixture of polycarbonate-polysiloxane copolymer (B) and the modified (meth)acrylic copolymer resin (C) may include the modified (meth)acrylic copolymer resin (C) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, or 88 wt %. Further, according to some embodiments of the present invention, the amount of modified (meth)acrylic copolymer resin (C) can be in a range from about any of the foregoing amounts to about any other of the foregoing amounts.

When the polycarbonate-polysiloxane copolymer (B) and the modified (meth)acrylic copolymer resin (C) are mixed in a weight ratio within this range, the resin composition can exhibit an excellent balance of properties such as impact resistance, scratch resistance, transparency, heat resistance, fluidity, and/or coloring property.

(D) Phosphorous-Based Flame Retardant

Examples of the phosphorus-based flame retardant may include without limitation phosphates, phosphonates, phosphinates, phosphine oxides, phosphazenes, and the like, and their metal salts. These phosphorous-based flame retardants may be used alone or in combination of two or more thereof.

In one embodiment, the phosphorus-based flame retardant (D) is an aromatic phosphate ester represented by Formula 4:

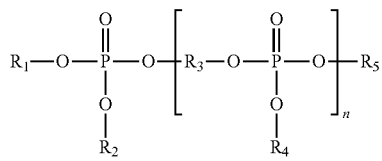

[Formula 4]

wherein $R_1$, $R_2$, $R_4$, and $R_5$ are the same or different and are each independently $C_6$-$C_{20}$ aryl or $C_1$-$C_{10}$ alkyl substituted $C_6$-$C_{20}$ aryl, $R_3$ is derived from a dialcohol of resorcinol, hydroquinol, bisphenol-A or bispheol-S, and n is an integer from 1 to 5.

In one embodiment, examples of the aromatic phosphate ester compound may include without limitation resorcinol bis(diphenyl phosphate), hydroquinol bis(diphenyl phosphate), bisphenol-A bis(diphenyl phosphate), resorcinol bis (2,6-di-tert-butylphenyl phosphate), hydroquinol bis(2,6-dimethylphenyl phosphate) and the like. These may be used in the form of a mixture of oligomer types. These compounds may be used alone or in combination of two or more thereof.

The aromatic phosphate ester compound may be used in combination of two or more thereof. In one embodiment, a mixture of biphenol-A bis(diphenyl phosphate) and resorcinol bis(diphenyl phosphate) may be used. The ratio between biphenol-A bis(diphenyl phosphate) and resorcinol bis(diphenyl phosphate) may be about 10:1 to about 25:1.

The resin composition may include the phosphorus-based flame retardant (D) in an amount of about 1 part by weight to about 50 parts by weight, for example about 5 parts by weight to about 30 parts by weight, and as another example about 10 parts by weight to about 25 parts by weight, based on about 100 parts by weight of the components (A)+(B)+(C). In some embodiments, the resin composition may include the phosphorus-based flame retardant (D) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of phosphorus-based flame retardant (D) can be in a range from about any of the foregoing amounts to about any other of the foregoing amounts.

When the resin composition includes the phosphorus-based flame retardant (D) in an amount within this range, the resin composition may exhibit an excellent balance of properties such as flame retardancy, transparency and/or impact strength.

(E) Other Additives

The polycarbonate resin composition may further include one or more additives. Examples of the additives include without limitation anti-dripping agents, antimicrobial agents, heat stabilizers, antioxidants, release agents, light stabilizers, inorganic additives, surfactants, coupling agents, plasticizers, blending agents, stabilizers, lubricants, antistatic agents, colorants, fire-proofing agents, weather-proofing agents, coloring agents, UV absorbers, UV blocking agents, flame retardants, fillers, nucleating agents, adhesion aids, adhesives, and the like, and combinations thereof.

Examples of anti-dripping agents may include without limitation polytetrafluoroethylene, and the like. However, when the anti-dripping agent is added, transparency may be reduced. Thus, the anti-dripping agent may be present in an amount of about 2 parts by weight or less, for example about 1.5 parts by weight or less, as another example about 1 part by weight or less, and as another example about 0.8 parts by weight or less, based on about 100 parts by weight of the components (A)+(B)+(C). When the amount exceeds this range, transparency can be reduced.

Examples of antioxidants may include without limitation phenol antioxidants, phosphite antioxidants, thioether antioxidants, amine antioxidants, and the like, and combinations thereof.

Examples of release agents may include without limitation fluorine containing polymers, silicone oils, metal salts of stearic acid, metal salts of montanic acid, montanic acid ester waxes, polyethylene waxes, and the like, and combinations thereof.

Examples of weather-proofing agents may include without limitation benzophenone weather-proofing agents, hindered amine weather-proofing agents, and the like, and combinations thereof.

Examples of coloring agents may include without limitation dyes, pigments, and the like, and combinations thereof.

Examples of UV blocking agents may include without limitation titanium dioxide ($TiO_2$), carbon black, and the like, and combinations thereof. Examples of the carbon black may include without limitation a conductive carbon black, such as graphitized carbon, furnace black, acetylene black, and the like, and combinations thereof.

Examples of fillers may include without limitation glass fibers, carbon fibers, silica, mica, alumina, clay, calcium carbonate, calcium sulfate, glass beads, and the like, and combinations thereof.

Examples of nucleating agents may include without limitation talc, clay, and the like, and combinations thereof.

The additives may be properly added as long as properties of the polycarbonate resin composition are not deteriorated. In one embodiment, the additives may be present in an amount of about 40 parts by weight or less based on about 100 parts by weight of the components (A)+(B)+(C). In another embodiment, the additives may be present in an amount of about 0.1 to 30 parts by weight based on about 100 parts by weight of the components (A)+(B)+(C).

The polycarbonate resin composition can have excellent intrinsic impact strength and thus does not need to include impact modifiers or rubber components. The rubber components include rubber modified copolymers, such as ABS, MABS, AES, AAS and the like. When the resin composition includes the impact modifiers or the rubber components, transparency may be reduced.

The polycarbonate resin composition may be prepared by any known method of preparing a resin composition. For example, the above components and the other additives can be mixed and subjected to melt extrusion in an extruder to yield pellets.

The present invention also provides a molded product using the polycarbonate resin composition. That is, the polycarbonate resin composition may be formed into molded products via various processes, such as injection molding, blow molding, extrusion molding, and compression molding. In particular, the resin composition can be useful for molded products, e.g., electric and electronic components and automobile components requiring impact resistance, scratch resistance, transparency, and heat resistance.

Now, the present invention will be explained in more detail with reference to the following examples. These examples are provided for illustration only and are not to be in any way construed as limiting the present invention, which is limited only by the accompanying claims.

EXAMPLES

Details of components used in Examples and Comparative Examples are as follows.

(A) Polycarbonate Resin

INIFINO polycarbonate having an MFI of 8 g/10 min at 310° C. and 1.2 kgf produced by Cheil Industries Inc. is used.

(B) Polycarbonate-Polysiloxane Copolymer

TARFLON polycarbonate-polysiloxane copolymer produced by Idemitsu Chemicals is used.

(C) Modified (Meth)Acrylic Copolymer Resin (C-1) A copolymer having a weight average molecular weight of 20,000 g/mol and having a refractive index of about 1.514 to 1.516 prepared by a conventional suspension polymerization of 65 wt % of methyl methacrylate and 35 wt % of phenyl methacrylate is used.

(C-2) A copolymer having a weight average molecular weight of 40,000 g/mol and having a refractive index of about 1.514 to 1.516 prepared by conventional suspension polymerization of 65 wt % of methyl methacrylate and 35 wt % of phenyl methacrylate is used.

(C-3) A copolymer having a weight average molecular weight of 120,000 g/mol and having a refractive index of about 1.514 to 1.516 prepared by conventional suspension polymerization of 65 wt % of methyl methacrylate and 35 wt % of phenyl methacrylate is used.

(C') Poly(Methyl Methacrylate)

Poly(methyl methacrylate) having a weight average molecular weight of 12,000 g/mol produced by Cheil Industries Inc. is used.

(D) Phosphorous-Based Flame Retardant (D-1) Bisphenol-A bis(diphenyl phosphate) (BDP) produced by Daihachi Co., Ltd. is used.

(D-2) Resorcinol bis(diphenyl phosphate) (RDP) produced by Daihachi Co., Ltd. is used.

(E) Additives (E-1) Polytetrafluoroethylene (PTFE) (FS-200 product of Hananotech Inc.) is used.

(E-2) Metablen C-223A produced by Mitsubishi Rayon Company is used.

(E-3) ABS resin consisting of 36 wt % of SAN and 64 wt % of g-ABS and produced by Cheil Industries Inc. is used.

Examples 1 to 6 and Comparative Examples 1 to 2

Properties Change in Accordance with the Content of Modified (Meth)Acrylic Copolymer Resin The above components are added in an amount as listed in Table 1. After extrusion using a 45Φ twin-screw extruder, the extruded product is dried in a dehumidifying dryer at 100° C. for 4 hours, thereby preparing pellets. The pellets are dried at 80° C. for 4 hours and subjected to injection-molding to prepare ASTM dumbbell specimens using an injection molding machine with an injection molding capacity of 6 oz by setting a cylinder temperature of about 210° C. to 230° C., a mold temperature of about 100° C., and a molding cycle time of about 30 seconds. Physical properties of the specimens are measured as follows and results are shown in Tables 1 to 3.

1) Transmittance: Transmittance is measured using a 2.5 mm thickness specimen in accordance with ASTM D1003 (unit: %).

2) Haze: Haze is measured using a 2.5 mm thickness specimen in accordance with ASTM D1003 (unit: %).

3) Pencil hardness: Pencil hardness is determined after leaving a specimen at 23° C. and 50% relative humidity for 48 hours. A specimen is prepared in a size of 3 mm×10 cm×10 cm (thickness, length and width) at 23° C. under a load of 0.5 kgf in accordance with ASTM D3362. After drawing five lines on the surface of the specimen, scratch level is observed with the naked eye. When two or more scratch lines are formed on the surface of the specimen, pencil hardness ratings are classified as below:

(Pencil Hardness Ratings)
6B-5B-4B-3B-2B-B-HB-F-H-2H-3H-4H-5H-6H
Softer Harder

4) Ball type scratch profile (BSP) width: A load of 1 kgf is applied to a specimen using a tungsten carbide stylus having a spherical tip with a diameter of 0.7 mm based on the Cheil method and a scratch is formed on the specimen at a rate of 75 mm/min, followed by observation of profile and measurement of scratch width using a surface profiler (unit: μm).

5) IZOD impact strength: Unnotched-IZOD impact strength is measured using a ⅛" thickness specimen in accordance with ASTM D256 standards (unit: kgf·cm/cm).

6) Flame retardancy: Flame retardancy is measured on a 1/16" thickness specimen in accordance with UL94.

7) Coloring property: The plate-type specimen having a 2.5 mm thickness prepared by injection molding based on the Cheil method is observed with the naked eye. The coloring property ratings are classified as below:
⊚: excellent, ○: good, Δ: fair, X: poor

TABLE 1

|  |  | Example |  |  |  |  |  | Comparative Example |  |
|---|---|---|---|---|---|---|---|---|---|
|  | Unit | 1 | 2 | 3 | 4 | 5 | 6 | 1 | 2 |
| (A) | wt % | 60 | 50 | 40 | 30 | 20 | 50 | 60 | 60 |
| (B) | wt % | 30 | 30 | 30 | 30 | 30 | 30 | 40 | — |
| (C-1) | wt % | 10 | 20 | 30 | 40 | 50 | — | — | 40 |
| (C-2) | wt % | — | — | — | — | — | 20 | — | — |
| (D-1) | parts by weight | 15 | 15 | 15 | 15 | 15 | 15 | 15 | 15 |
| (D-2) | parts by weight | 1 | 1 | 1 | 1 | 1 | 1 | 1 | 1 |
| Transmittance | % | 90 | 90 | 90 | 90 | 90 | 83 | 90 | 90 |
| Haze | % | 0.9 | 0.9 | 0.9 | 0.9 | 0.9 | 2.2 | 0.9 | 0.9 |
| Pencil hardness | ratings | F | H | H | 2H | 3H | H | 2B | 2H |

TABLE 1-continued

|  | Unit | Example 1 | Example 2 | Example 3 | Example 4 | Example 5 | Example 6 | Comparative Example 1 | Comparative Example 2 |
|---|---|---|---|---|---|---|---|---|---|
| BSP width | μm | 285 | 260 | 250 | 230 | 200 | 261 | 330 | 230 |
| IZOD impact strength | kgf · cm/cm | N.B. | 150 | 120 | 90 | 70 | 155 | N.B. | 15 |
| Flame retardancy | UL94 ratings | V-2 | V-2 | V-2 | V-2 | V-2 | V-2 | V-2 | V-2 |

* N.B.: Non-break

As shown in Table 1, when the physical properties of the polycarbonate resin compositions including 30% of polycarbonate-polysiloxane copolymer are compared by changing the amount of the modified (meth)acrylic copolymer resin, it can be seen that as the amount of the modified (meth)acrylic copolymer resin increases, scratch resistance is remarkably improved while impact resistance is decreased. When comparing Example 4 with Comparative Example 2 in which the polycarbonate-polysiloxane copolymer is not used, a significant difference in impact strength is apparent. When comparing Example 1 with Comparative Example 1 in which the modified (meth)acrylic copolymer resin is not used, Example 1 shows similar impact resistance but remarkably increased scratch resistance. Meanwhile, when comparing Example 2 with Example 6 in which the amount of the modified (meth)acrylic copolymer resin is identical but the molecular weight thereof is changed, different transmittance depending on the molecular weight of the modified (meth)acrylic copolymer resin is observed. Namely, it could be confirmed that in order to obtain transparency, the modified (meth)acrylic copolymer resin should have a weight average molecular weight ranging from 5,000 g/mol to 25,000 g/mol.

Example 2, Examples 7 to 10 and Comparative Examples 3 to 4

Properties Change in Accordance with Content of Flame Retardant

The properties of the polycarbonate resin compositions are measured in the same manner as in Example 2 except that the amount of each component is changed as shown in Table 2.

TABLE 2

|  | Unit | Example 7 | Example 2 | Example 8 | Example 9 | Example 10 | Comparative Example 3 | Comparative Example 4 |
|---|---|---|---|---|---|---|---|---|
| (A) | wt % | 50 | 50 | 50 | 50 | 50 | 50 | 50 |
| (B) | wt % | 30 | 30 | 30 | 30 | 30 | 30 | 30 |
| (C-1) | wt % | 20 | 20 | 20 | 20 | 20 | 20 | 20 |
| (D-1) | parts by weight | 12 | 15 | 20 | 15 | 15 | — | 15 |
| (D-2) | parts by weight | 1 | 1 | 1 | 1 | 1 | — | 1 |
| (E-1) | parts by weight | — | — | — | 0.4 | 0.8 | — | 3.0 |
| Transmittance | % | 90 | 90 | 90 | 75 | 70 | 90 | 20 |
| Haze | % | 0.9 | 0.9 | 0.9 | 40 | 60 | 0.9 | 90 |
| Pencil hardness | ratings | H | H | H | H | H | H | H |
| BSP width | μm | 257 | 260 | 263 | 260 | 260 | 252 | 260 |
| IZOD impact strength | kgf · cm/cm | 165 | 150 | 120 | 150 | 150 | N.B. | 150 |
| Flame retardancy | UL94 ratings | V-2 | V-2 | V-2 | V-0 | V-0 | Fail | V-0 |

* N.B.: Non-break

As shown in Table 2, the addition of BDP flame retardant did not affect transmittance at all. When a PTFE anti-dripping agent is added in order to accomplish V-0 flame retardancy, the transmittance decreased. When the PTFE anti-dripping agent is added in an amount less than 2 parts by weight, a translucent state is maintained. However, when the PTFE anti-dripping agent is added in an excessive amount as in Comparative Example 4, the molded product becomes opaque.

Examples 11 to 12 and Comparative Examples 5 to 7

Effect of Coloring Property

The properties of the polycarbonate resin compositions are measured in the same manner as in Example 2 except that the amount of each component is changed as shown in Table 3 and that carbon black is added in order to evaluate the effect of coloring property.

TABLE 3

|  | Unit | Example 11 | Example 12 | Comparative Example 5 | Comparative Example 6 | Comparative Example 7 |
|---|---|---|---|---|---|---|
| (A) | wt % | 50 | 50 | 80 | 75 | 75 |
| (B) | wt % | 30 | 30 | — | — | — |
| (C-1) | wt % | 20 | 20 | — | — | — |
| (C-3) | wt % | — | — | 20 | — | — |
| (C') | wt % | — | — | — | 20 | — |
| (D-1) | parts by weight | 15 | 15 | 15 | 15 | 17 |
| (D-2) | parts by weight | 1 | 1 | 1 | 1 | 1 |
| (E-1) | parts by weight | — | 0.5 | — | — | — |
| (E-2) | parts by weight | — | — | — | 5 | — |
| (E-3) | parts by weight | — | — | — | — | 25 |
| Carbon black | parts by weight | 0.2 | 0.2 | 0.2 | 0.2 | 0.2 |
| Coloring property | ratings | ◎ | ◎ | ○ | △ | X |
| Pencil Hardness | ratings | H | H | H | HB | 2B |
| BSP width | μm | 260 | 260 | 260 | 300 | 335 |
| Flame retardancy | UL94 ratings | V-2 | V-0 | V-0 | V-0 | V-0 |

As shown in Table 3, Examples 11 and 12 have excellent appearance and thus all of the properties required for the corresponding application fields such as high gloss, flame retardancy and scratch resistance could be ensured. In contrast, when the molecular weight of the modified (meth)acrylic copolymer resin is higher as in Comparative Example 5, excellent coloring property could not be ensured. In Comparative Example 6 in which low molecular weight PMMA is used instead of the modified (meth)acrylic copolymer resin and an impact modifier is employed, although a fair coloring property is obtained, the resin composition cannot be used as a non-painted material due to poor scratch resistance. Meanwhile, in Comparative Example 7 which is a general combination of flame retardant PC/ABS, the resin composition has undesired properties in terms of both coloring property and scratch resistance.

The polycarbonate resin composition according to the present invention can have excellent properties in terms of coloring property, impact resistance, heat resistance, scratch resistance, transparency and/or flame retardancy, and can be economical and eco-friendly through elimination of a coating process. Therefore, the resin composition may be used to develop non-painted materials requiring such properties at the same time.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A flame retardant polycarbonate resin composition that can have excellent scratch resistance and impact resistance, comprising:
   (A) about 10 wt % to about 89 wt % of a polycarbonate resin;
   (B) about 10 wt % to about 89 wt % of a polycarbonate-polysiloxane copolymer;
   (C) about 1 wt % to about 70 wt % of a modified (meth) acrylic (co)polymer resin; and
   (D) about 1 part by weight to about 50 parts by weight of a phosphorus-based flame retardant based on about 100 parts by weight of the components (A)+(B)+(C),
   wherein the resin composition has a light transmittance of about 70% or more as measured using a 2.5 mm thickness specimen in accordance with ASTM D1003.

2. The polycarbonate resin composition according to claim 1, wherein the polycarbonate-polysiloxane copolymer (B) comprises about 1 wt % to about 99 wt % of a polycarbonate block and about 1 wt % to about 99 wt % of a polysiloxane block.

3. The polycarbonate resin composition according to claim 1, wherein the modified (meth)acrylic (co)polymer resin (C) has a refractive index ranging from about 1.495 to about 1.590.

4. The polycarbonate resin composition according to claim 1, wherein the modified (meth)acrylic (co)polymer resin (C) has a weight average molecular weight ranging from about 5,000 g/mol to about 25,000 g/mol.

5. The polycarbonate resin composition according to claim 1, wherein the modified (meth)acrylic (co)polymer resin (C) has a weight average molecular weight ranging from about 25,000 g/mol to about 50,000 g/mol.

6. The polycarbonate resin composition according to claim 1, wherein the weight ratio of the polycarbonate-polysiloxane copolymer (B) to the modified (meth)acrylic (co)polymer (C) ranges from about 12:88 to about 99:1.

7. The polycarbonate resin composition according to claim 1, wherein the phosphorus-based flame retardant (D) comprises a phosphate, a phosphonate, a phosphinate, a phosphine oxide, a phosphazene, a metal salt thereof, or a combination thereof.

8. The polycarbonate resin composition according to claim 1, wherein the phosphorus-based flame retardant (D) is a mixture of two or more of aromatic phosphate esters represented by Formula 4:

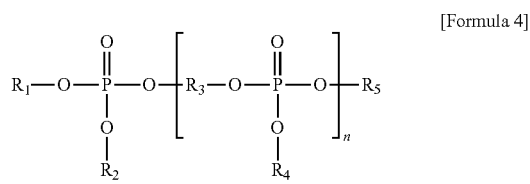

[Formula 4]

wherein $R_1$, $R_2$, $R_4$, and $R_5$ are the same or different and are each independently C6-C20 aryl or C1-C10 alkyl substituted C6-C20 aryl, $R_3$ is derived from a dialcohol of resorcinol, hydroquinol, bisphenol-A or bispheol-S, and n is an integer from 1 to 5.

9. The polycarbonate resin composition according to claim 1, wherein the resin composition further comprises antimicrobial agent, heat stabilizer, antioxidant, release agent, light stabilizer, inorganic additive, surfactant, coupling agent, plasticizer, blending agent, stabilizer, lubricant, antistatic agent, colorant, flame-proofing agent, weather-proofing agent, coloring agent, UV absorber, UV blocking agent, flame retardant, filler, nucleating agent, adhesion aid, adhesive or a combination thereof.

10. The polycarbonate resin composition according to claim 1, wherein the polycarbonate resin composition has a light transmittance of about 90% or more as measured using a 2.5 mm thickness specimen in accordance with ASTM D1003, a haze of less than about 2.5% as measured using a 2.5 mm thickness specimen in accordance with ASTM D1003, and a flame retardancy of V-2 or more as measured using a 1/16" thickness specimen in accordance with UL94.

11. The polycarbonate resin composition according to claim 1, wherein the resin composition has a light transmittance of about 70% to about 90% as measured using a 2.5 mm thickness specimen in accordance with ASTM D1003, a haze of about 40% to about 60% as measured using a 2.5 mm thickness specimen in accordance with ASTM D1003, and a flame retardancy of V-0 or more as measured using a 1/16" thickness specimen in accordance with UL94.

12. The polycarbonate resin composition according to claim 1, wherein the modified (meth)acrylic (co)polymer resin (C) is a (co)polymer of aromatic (meth)acrylate, alicyclic (meth)acrylate, or a mixture thereof.

13. The polycarbonate resin composition according to claim 12, wherein the modified (meth)acrylic (co)polymer resin (C) is a (co)polymer of (C1) about 20 wt % to about 100 wt % of an aromatic (meth)acrylate represented by Formula 3-1, an alicyclic (meth)acrylate represented by Formula 3-2, or a mixture thereof, and (C2) 0 to about 80 wt % of a monofunctional unsaturated monomer:

[Formula 3-1]

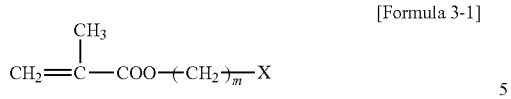

wherein m is an integer from 0 to 10, and X is substituted or unsubstituted C6 to C30 aryl, substituted or unsubstituted C3 to C30 cycloalkyl, substituted or unsubstituted C3 to C30 cycloalkenyl, or substituted or unsubstituted C3 to C30 cycloalkynyl,

[Formula 3-2]

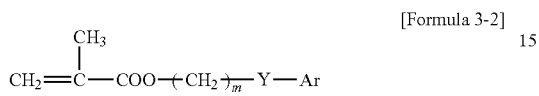

wherein m is an integer from 0 to 10, Y is oxygen (O) or sulfur (S), and Ar is substituted or unsubstituted C6 to C30 aryl, substituted or unsubstituted C3 to C30 cycloalkyl, substituted or unsubstituted C3 to C30 cycloalkenyl, or substituted or unsubstituted C3 to C30 cycloalkynyl.

14. The polycarbonate resin composition according to claim 13, wherein the monofunctional unsaturated monomer (C2) is present and comprises a (meth)acrylate ester, unsaturated carboxylic acid, acid anhydride, hydroxyl group-containing ester, amide, nitrile, allyl glycidyl ether, glycidyl methacrylate, styrene monomer or a combination thereof.

15. A molded product produced using the polycarbonate resin composition according to claim 1.

* * * * *